(12) United States Patent
Mi et al.

(10) Patent No.: US 11,520,141 B2
(45) Date of Patent: Dec. 6, 2022

(54) OPTICAL LENS

(71) Applicant: Dongguan Yutong Optical Technology Co., Ltd., Dongguan (CN)

(72) Inventors: Shilong Mi, Dongguan (CN); Zhanjun Zhang, Dongguan (CN); Lei Zhang, Dongguan (CN); Danyi Wang, Dongguan (CN); Ni Han, Dongguan (CN); Chuangbiao Liu, Dongguan (CN)

(73) Assignee: Dongguan Yutong Optical Technology Co., Ltd., Dongguan (CN)

( * ) Notice: Subject to any disclaimer, the term of this patent is extended or adjusted under 35 U.S.C. 154(b) by 299 days.

(21) Appl. No.: 16/902,140

(22) Filed: Jun. 15, 2020

(65) Prior Publication Data
US 2021/0223545 A1    Jul. 22, 2021

(30) Foreign Application Priority Data
Jan. 17, 2020    (CN) .......................... 202010052047.8

(51) Int. Cl.
  *G02B 13/06*    (2006.01)
  *G02B 27/00*    (2006.01)
  (Continued)

(52) U.S. Cl.
  CPC ........... *G02B 27/0081* (2013.01); *G02B 9/64* (2013.01); *G02B 13/0045* (2013.01); *G02B 13/18* (2013.01)

(58) Field of Classification Search
  CPC ...... G02B 9/64; G02B 13/18; G02B 13/0045; G02B 13/06; G02B 13/006
  (Continued)

(56) References Cited

U.S. PATENT DOCUMENTS

2018/0095245 A1    4/2018  Kanzaki
2018/0284397 A1*  10/2018  Komiyama ............ G02B 13/06
(Continued)

FOREIGN PATENT DOCUMENTS

CN    105372789 A1    3/2016
JP    2018-522266 A    8/2018
(Continued)

OTHER PUBLICATIONS

Korean Office Action dated Sep. 29, 2021 for Korean Patent Application No. 10-2020-0085196 (with English translation).
(Continued)

*Primary Examiner* — Audrey Y Chang
(74) *Attorney, Agent, or Firm* — McCarter & English, LLP

(57) ABSTRACT

Provided is an optical lens. The optical lens is provided with a first lens, a second lens, a third lens, a fourth lens, a fifth lens, a sixth lens and a seventh lens, which are sequentially arranged from an object side to an image side along an optical axis. The first lens is a spherical lens having a negative focal power, the second lens is an aspheric lens having a meniscus shape bent towards an image surface, the third lens is an aspheric lens having a meniscus shape bent towards an object surface, the fourth lens is an aspheric lens having a positive focal power, the fifth lens is an aspheric lens having a positive focal power, the sixth lens is an aspheric lens having a negative focal power, and the seventh lens is an aspheric lens having a positive focal power.

10 Claims, 15 Drawing Sheets

(51) Int. Cl.
    *G02B 9/64*     (2006.01)
    *G02B 13/18*     (2006.01)
    *G02B 13/00*     (2006.01)

(58) Field of Classification Search
    USPC .................................................. 359/755, 657
    See application file for complete search history.

(56) References Cited

U.S. PATENT DOCUMENTS

| | | |
|---|---|---|
| 2018/0356616 A1 | 12/2018 | Bone et al. |
| 2019/0121071 A1 | 4/2019 | Zhao et al. |
| 2019/0324232 A1 | 10/2019 | Yang et al. |
| 2019/0339488 A1* | 11/2019 | Komiyama ............ G02B 13/18 |

FOREIGN PATENT DOCUMENTS

| | | |
|---|---|---|
| JP | 2019-066645 A | 4/2019 |
| JP | 2019/066645 A | 4/2019 |
| TW | 201802517 A1 | 1/2018 |
| WO | WO 2018/021205 | 2/2018 |

OTHER PUBLICATIONS

Taiwanese Office Action dated Jul. 13, 2020 for Taiwanese Patent Application No. 109118500 (without English translation).
European Search Report dated Jan. 25, 2021 for European Patent Application No. 20188229.7.

\* cited by examiner

OPTICAL LENS

TECHNICAL FIELD

An embodiment of the present disclosure relates to the field of optical imaging technology, and in particular, to an optical lens.

BACKGROUND

With the increasing development of a security monitoring system, requirements on a security lens are becoming higher and higher, and the requirements are mainly reflected in a higher image quality, a larger field of view, and a larger clear aperture. At present, an existing ultra-large aperture lens tends to have a smaller angle of field of view, but in the field of security monitoring, a larger angle of field of view means a wider monitoring range, and therefore it is necessary to develop an optical lens aiming at a case that an existing angle of field of view is small.

SUMMARY

The present disclosure provides an optical lens, which may ensure that an angle of field of view is larger than 110° while supporting an ultra-large aperture (e.g. $0.8<F\#<1.2$, F# denotes an aperture).

In order to achieve the above objectives, the present disclosure proposes an optical lens. The optical lens includes a first lens, a second lens, a third lens, a fourth lens, a fifth lens, a sixth lens and a seventh lens, which are sequentially arranged from an object side to an image side along an optical axis. The first lens is a spherical lens having a negative focal power. The second lens is an aspheric lens having a meniscus shape bent towards an image surface. The third lens is an aspheric lens having a meniscus shape bent towards an object surface. The fourth lens is an aspheric lens having a positive focal power. The fifth lens is an aspheric lens having a positive focal power. The sixth lens is an aspheric lens having a negative focal power. The seventh lens is an aspheric lens having a positive focal power. The sixth lens and the seventh lens form a cemented doublet lens.

Optionally, the first lens is made of glass, the second lens is made of plastic, the third lens is made of plastic, the fourth lens is made of glass, the fifth lens is made of plastic, the sixth lens is made of plastic, and the seventh lens is made of plastic.

Optionally, a surface of one side of the lens closest to the object surface is an object side surface, and a surface of one side of the lens closest to the image surface is an image side surface. An object side surface of the first lens is a convex surface, and an image side surface of the first lens is a concave surface. An object side surface of the second lens is the convex surface, and an image side surface of the second lens is the concave surface. An object side surface of the third lens is the concave surface, and an image side surface of the third lens is the convex surface. An object side surface of the fourth lens is the convex surface, and an image side surface of the fourth lens is the convex surface. An object side surface of the fifth lens is the convex surface, and an image side surface of the fifth lens is the convex surface. An object side surface of the sixth lens is the concave surface, and an image side surface of the sixth lens is the concave surface. An object side surface of the seventh lens is the convex surface, and an image side surface of the seventh lens is a convex surface.

Optionally, the first lens and the optical lens satisfy the following relational expression: $1.5<|f1/f|<4.0$, where f1 is a focal length of the first lens, and f is a focal length of an optical system of the optical lens.

Optionally, the second lens and the optical lens satisfy the following relational expression: $|f2/f|>5$, where f2 is a focal length of the second lens, and f is a focal length of an optical system of the optical lens.

Optionally, the second lens satisfies the following relational expression: $0.9<|ET2/CT2|<2.0$, where ET2 is a thickness of an edge of the second lens in an axial direction, and CT2 is a thickness of a center of the second lens in the axial direction.

Optionally, the third lens and the optical lens satisfy the following relational expression: $|f3/f|>5$, where f3 is a focal length of the third lens, and f is a focal length of an optical system of the optical lens.

Optionally, the fourth lens and the optical lens satisfy the following relational expression: $1.5<|f4/f|<4$, where f4 is a focal length of the fourth lens, f is a focal length of an optical system of the optical lens, and a refractive index of the fourth lens satisfies the following relational expression: $nd4>1.6$.

Optionally, the fifth lens and the optical lens satisfy the following relational expression: $1.5<|f5/f|<4$, where f5 is a focal length of the fifth lens, and f is a focal length of an optical system of the optical lens.

Optionally, the sixth lens and the optical lens satisfy the following relational expression: $0.8<|f6/f|<3$, the seventh lens and the optical lens satisfy the following relational expression: $1<|f7/f|<4$, where f6 is a focal length of the sixth lens, f7 is a focal length of the seventh lens, and f is a focal length of an optical system of the optical lens. An Abbe number of the sixth lens and an Abbe number of the seventh lens satisfy the following relational expression: $|vd6-vd7|>30$.

The optical lens proposed according to the embodiments of the present disclosure is provided with the first lens, the second lens, the third lens, the fourth lens, the fifth lens, the sixth lens and the seventh lens, which are sequentially arranged from the object side to the image side along the optical axis. The first lens is the spherical lens having the negative focal power, the second lens is the aspheric lens having the meniscus shape bent towards the image surface, the third lens is the aspheric lens having the meniscus shape bent towards the object surface, the fourth lens is the aspheric lens having the positive focal power, the fifth lens is the aspheric lens having the positive focal power, the sixth lens is the aspheric lens having the negative focal power, and the seventh lens is the aspheric lens having the positive focal power, where the sixth lens and the seventh lens form the cemented doublet lens, so that the angle of field of view of the optical lens is greater than 110°, and the F-number (F#) satisfies the following relational expression: $0.8<F\#<1.2$.

DETAILED DESCRIPTION

Figure 1:
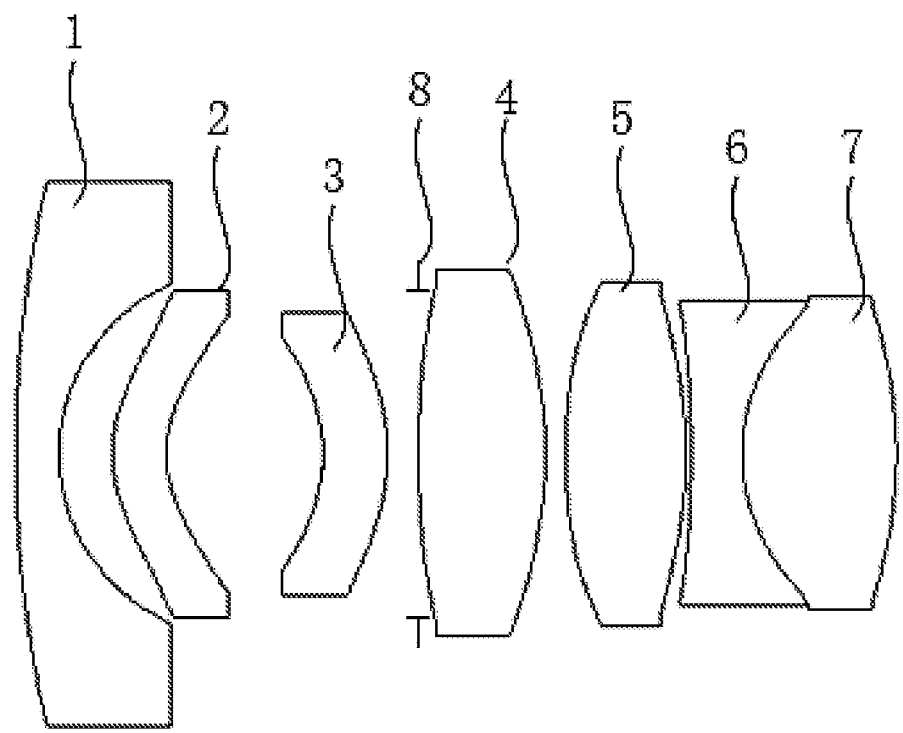
FIG. 1 is a structural view of an optical lens according to an embodiment of the present disclosure.

The present disclosure will be further described in detail below in conjunction with the accompanying drawings and embodiments. It is to be understood that the specific embodiments described herein are merely illustrative of the present disclosure and are not intended to limit the present disclosure. It should also be noted that, for ease of description, only some, but not all, of the structures related to the present disclosure are shown in the drawings.

FIG. 1 is a schematic structural view of an optical lens according to an embodiment of the present disclosure. As shown in FIG. 1, the optical lens includes a first lens 1, a second lens 2, a third lens 3, a fourth lens 4, a fifth lens 5, a sixth lens 6 and a seventh lens 7, which are sequentially arranged from an object side to an image side along an optical axis. The first lens 1 is a spherical lens having a negative focal power, the second lens 2 is an aspheric lens having a meniscus shape bent towards an image surface, the third lens 3 is an aspheric lens having a meniscus shape bent towards an object surface, the four lens 4 is an aspheric lens having a positive focal power, the fifth lens 5 is an aspheric lens having a positive focal power, the sixth lens 6 is an aspheric lens having a negative focal power, and the seventh lens 7 is an aspheric lens having a positive focal power, where the sixth lens 6 and the seventh lens 7 form a cemented doublet lens.

It will be appreciated that the focal power is equal to a difference between an image side beam convergence and an object side beam convergence, and represents an ability of an optical system to deflect light. An absolute value of the focal power is the larger, a bending ability to the light is the stronger, and the absolute value of the focal power is the smaller, the bending ability to the light is the weaker. When the focal power is a positive number, a refraction of the light is convergent; and when the focal power is a negative number, the refraction of the light is divergent. The focal power may be suitable for characterizing a certain refractive surface of a lens (i.e., a surface of the lens), or characterizing a certain lens, or characterizing a system (i.e., a lens group) formed by multiple lenses together. In this embodiment, each lens may be fixed in a lens barrel (not shown in FIG. 1), an imaging effect of a large-aperture fixed-focus lens is better by reasonably distributing the focal power of the lens, where the focal power is a reciprocal of a focal length.

It should be noted that a focal power of the second lens 2 and a focal power of the third lens 3 are not limited. That is, center thicknesses and edge thicknesses of the second lens 2 and the third lens 3 may be set according to an actual condition, and only a bending direction of an image side surface and a bending direction of an object side surface need to be ensured.

Optionally, the first lens 1 is made of glass, the second lens 2 is made of plastic, the third lens 3 is made of plastic, the fourth lens 4 is made of glass, the fifth lens 5 is made of plastic, the sixth lens 6 is made of plastic, and the seventh lens 7 is made of plastic.

Optionally, a surface of one side of the lens closest to the object surface is an object side surface, and a surface of one side of the lens closest to the image surface is an image side surface;

An object side surface of the first lens 1 is a convex surface, and an image side surface of the first lens 1 is a concave surface; an object side surface of the second lens 2 is a convex surface, and an image side surface of the second lens 2 is a concave surface; an object side surface of the third lens 3 is a concave surface, and an image side surface of the third lens 3 is a convex surface; an object side surface of the fourth lens 4 is a convex surface, and an image side surface of the fourth lens 4 is a convex surface; an object side surface of the fifth lens 5 is a convex surface, and an image side surface of the fifth lens 5 is a convex surface; an object side surface of the sixth lens 6 is a concave surface, and an image side surface of the sixth lens 6 is a concave surface; and an object side surface of the seventh lens 7 is a convex surface, and an image side surface of the seventh lens 7 is a convex surface.

Optionally, the first lens 1 and the optical lens satisfy the following relational expression: $1.5 < |f1/f| < 4.0$, where f1 is a focal length of the first lens, and f is a focal length of the optical system of the optical lens. The first lens 1 has a function of collecting the light, the negative focal power is suitable for a lens having a relatively large angle of field of view, and the first lens 1 is a glass spherical lens, has good physical and chemical properties, and is higher in adaptability to an environment.

Optionally, the second lens and the optical lens satisfy the following relational expression: $|f2/f| > 5$, where f2 is a focal length of the second lens, and f is a focal length of the optical system of the optical lens.

Optionally, the second lens 2 satisfies the following relational expression: $0.9<|ET2/CT2|<2.0$, where ET2 is a thickness of an edge of the second lens in an axial direction, and CT2 is a thickness of a center of the second lens in the axial direction.

The second lens 2 is mainly used for correcting an on-axis aberration, and the second lens 2 satisfies the following relational expression: $0.9<|ET2/CT2|<2.0$, which ensures that the second lens 2 has a better processability.

Optionally, the third lens and the optical lens satisfy the following relational expression: $|f3/f|>5$, where f3 is a focal length of the third lens, and f is a focal length of the optical system of the optical lens.

The third lens 3 is mainly used for correcting an off-axis aberration.

Optionally, the fourth lens and the optical lens satisfy the following relational expression: $1.5<|f4/f|<4$, where f4 is a focal length of the fourth lens 4, f is a focal length of the optical system of the optical lens, and a refractive index of the fourth lens 4 satisfies the following relational expression: nd4>1.6.

A position of the fourth lens 4 is more favorable for correcting a spherical aberration and a coma aberration, and the focal length in this range is favorable for controlling a volume of the lens, so that the requirement of a large aperture is satisfied.

Optionally, the fifth lens and the optical lens satisfy the following relational expression: $1.5<|f5/f|<4$, where f5 is a focal length of the fifth lens, and f is a focal length of the optical system of the optical lens.

The fifth lens 5 is mainly used for further correcting the off-axis aberration.

Optionally, the sixth lens and the optical lens satisfy the following relational expression: $0.8<|f6/f|<3$, the seventh lens and the optical lens satisfy the following relational expression: $1<|f7/f|<4$, where f6 is a focal length of the sixth lens, f7 is a focal length of the seventh lens, and f is a focal length of the optical system of the optical lens. An Abbe number of the sixth lens and an Abbe number of the seventh lens satisfy the following relational expression: $|vd6-vd7|>30$, and vd6 is the Abbe number of the sixth lens and vd7 the Abbe number of the seventh lens. The sixth lens 6 and the seventh lens 7 are cemented to correct a chromatic aberration better.

It should be noted that an aperture F of the optical lens satisfies the following relational expression: $0.8<F<1.2$; an angle of field of view is greater than 110°, an image height satisfies the following relational expression: $0.85<ImgH/EFL<1.35$, where ImgH denotes a half-image height of the lens, and EFL denotes a focal length of the lens.

In an exemplary embodiment, a sum ΣT of a separation distance between any two adjacent lenses among the first lens 1 to the seventh lens 7 in the optical axis, a distance TD between the object side surface of the first lens 1 and the image side surface of the seventh lens 7 in the optical axis, and a distance BFL between the image side surface of the seventh lens 7 and the image surface of the seventh lens 7 in the optical axis satisfies following expression: $0.8<BFL*ΣT/TD<2$. When this conditional expression is satisfied, it is conducive to reasonably distribute an on-axis space, and a good balance is achieved between reducing an overall length of the optical system and improving an imaging quality.

The following describes the optical lens proposed by the present disclosure with the specific embodiments.

First Embodiment

As shown in FIG. 1, an optical lens includes a first lens 1, a second lens 2, a third lens 3, a fourth lens 4, a fifth lens 5, a sixth lens 6 and a seventh lens 7, which are sequentially arranged from an object side to an image side along an optical axis;

The first lens 1 is a spherical lens having a negative focal power, the second lens 2 is an aspheric lens having a meniscus shape bent towards an image surface, the third lens 3 is an aspheric lens having a meniscus shape bent towards an object surface, the four lens 4 is an aspheric lens having a positive focal power, the fifth lens 5 is an aspheric lens having a positive focal power, the sixth lens 6 is an aspheric lens having a negative focal power, and the seventh lens 7 is an aspheric lens having a positive focal power, where the sixth lens 6 and the seventh lens 7 form a cemented doublet lens. An object side surface of the first lens 1 is a convex surface, and an image side surface of the first lens 1 is a concave surface; an object side surface of the second lens 2 is a convex surface, and an image side surface of the second lens 2 is a concave surface; an object side surface of the third lens 3 is a concave surface, and an image side surface of the third lens 3 is a convex surface; an object side surface of the fourth lens 4 is a convex surface, and an image side surface of the fourth lens 4 is a convex surface; an object side surface of the fifth lens 5 is a convex surface, and an image side surface of the fifth lens 5 is a convex surface; an object side surface of the sixth lens 6 is a concave surface, and an image side surface of the sixth lens 6 is a concave surface; and an object side surface of the seventh lens 7 is a convex surface, and an image side surface of the seventh lens 7 is a convex surface.

A focal power of the second lens 2 is negative, and a focal power of the third lens 3 is negative. The fourth lens 4 is configured as a glass aspheric lens, so that a refractive index of the fourth lens 4 is increased, and thus a degree of bending of light is increased, thereby making an optical total length of a large-aperture fixed-focus lens become short. The second lens, the third lens, the fifth lens, the sixth lens and the seventh lens are reasonably matched and configured to be plastic aspheric lenses, and the first lens 1 is a glass spherical lens, so that the cost is significantly controlled while the performance of an optical system is ensured. A shape and a thickness of each lens is uniform, and the processability of the lens is fully ensured.

A diaphragm 8 is further provided between the third lens 3 and the fourth lens 4.

Further, focal lengths of the first lens 1 to the seventh lens 7 satisfy following conditions.

TABLE 1

| f1 = −9.5 | \|f1/f\| = 2.9 |
|---|---|
| f2 = −60.1 | \|f2/f\| = 18.2 |
| f3 = −17.8 | \|f3/f\| = 5.3 |
| f4 = 6.67 | \|f4/f\| = 2.0 |
| f5 = 9.9 | \|f5/f\| = 3.0 |
| f6 = −4.9 | \|f6/f\| = 1.5 |
| f7 = 4.7 | \|f7/f\| = 1.4 |

Where f1 represents the focal length of the first lens 1, f2 represents the focal length of the second lens 2, f3 represents the focal length of the third lens 3, f4 represents the focal length of the fourth lens 4, f5 represents the focal length of the fifth lens 5, f6 represents the focal length of the six lens 6, f7 represents the focal length of the seventh lens 7, and f represents a focal length of the optical lens.

TABLE 2 a design value of the optical lens (f = 3.3 mm, F# = 1.0)

| surface sequence number | surface type | radius of curvature | thickness | refractive index | Abbe number | K value |
|---|---|---|---|---|---|---|
| S1 | spherical surface | 18.99 | 0.80 | 1.59 | 68.9 | |
| S2 | spherical surface | 4.28 | 0.80 | | | |
| S3 | aspheric surface | 2.57 | 1.20 | 1.54 | 55.7 | −0.76 |
| S4 | aspheric surface | 1.99 | 3.20 | | | −1.35 |
| S5 | aspheric surface | −3.20 | 1.20 | 1.64 | 23.9 | −3.71 |
| S6 | aspheric surface | −5.11 | 0.50 | | | −1.14 |
| diaphragm | plane | | 0.00 | | | |
| S8 | aspheric surface | 19.02 | 2.50 | 1.81 | 40.7 | 5.56 |
| S9 | aspheric surface | −7.07 | 0.50 | | | −7.04 |
| S10 | aspheric surface | 9.63 | 2.50 | 1.54 | 55.7 | 4.20 |
| S11 | aspheric surface | −10.61 | 0.20 | | | −5.95 |
| S12 | aspheric surface | −46.28 | 1.00 | 1.66 | 20.3 | −5.00 |
| S13 | aspheric surface | 3.50 | 3.00 | 1.54 | 55.7 | −2.28 |
| S14 | aspheric surface | −6.43 | 3.32 | | | −39.79 |

Surface sequence numbers in the table 2 are numbered according to a surface order of each lens, where "S1" represents a front surface of the first lens 1, "S2" represents a rear surface of the first lens 1, and so on. A radius of curvature represents a bending degree of a lens surface, a positive value represents that this surface is bent towards one side of the image surface, and a negative value represents that this surface is bent toward one side of the object surface, where a "PL" represents that this surface is a plane and the radius of curvature thereof is infinite; a thickness represents a central axial distance from a current surface to a next surface, a refractive index represents a deflection ability of a material between the current surface and the next surface to the light, a blank space represents that a current position is air, and the refractive index is 1; an Abbe number represents a dispersion characteristic of a material between the current surface and the next surface to the light, the blank space represents that the current position is air; K value represents a numerical magnitude of a best fitting cone coefficient for an aspheric surface.

The conic coefficient for the aspheric surface may be limited by the following aspheric relational expression, but not limited to the following representation method.

$$z = \frac{cr^2}{1+\sqrt{1-(1+k)c^2r^2}} + Ar^4 + Br^6 + Cr^8 + Dr^{10} + Er^{12} + Fr^{14}$$

Where z is a axial vector height of the aspheric surface in a Z direction, r is a height of the aspheric surface, c is a curvature of a fitted spherical surface, and a numerical value of the c is equal to a reciprocal of the radius of curvature. k is a fitting cone coefficient, and A-F are an order 4, an order 6, an order 8, an order 10, an order 12 and an order 14 of a polynomial of the aspheric surface.

TABLE 3 a design value of each aspheric parameter in the optical lens

| surface sequence number | A | B | C | D | E | F |
|---|---|---|---|---|---|---|
| S3 | −2.04E−03 | −4.11E−04 | −2.76E−05 | 8.99E−07 | 2.82E−07 | −1.41E−08 |
| S4 | 2.56E−03 | −4.57E−04 | −2.04E−04 | 3.20E−05 | −1.47E−06 | −8.76E−09 |
| S5 | −1.02E−02 | −2.89E−05 | 4.90E−05 | −1.14E−05 | 3.28E−06 | −3.75E−07 |
| S6 | 9.71E−04 | −2.03E−04 | −1.11E−05 | 6.90E−06 | −6.26E−07 | 9.23E−09 |
| S8 | 1.22E−03 | −8.50E−05 | 1.12E−05 | −6.22E−07 | −5.90E−09 | 4.70E−10 |
| S9 | 1.05E−03 | −6.23E−05 | 7.71E−06 | −2.22E−07 | −1.57E−08 | 4.81E−10 |
| S10 | 3.37E−03 | −2.15E−04 | 1.27E−06 | 1.09E−06 | −9.47E−08 | 2.99E−09 |
| S11 | −8.39E−04 | 1.23E−04 | 1.28E−05 | −9.06E−07 | −9.55E−08 | 6.61E−09 |
| S12 | −2.23E−03 | 1.24E−04 | 1.84E−05 | −1.19E−06 | −1.29E−07 | 6.58E−09 |
| S13 | 2.32E−03 | −6.30E−04 | 1.01E−04 | 3.18E−06 | −5.02E−07 | −1.86E−08 |
| S14 | −6.95E−03 | 8.00E−04 | 5.90E−06 | −5.19E−06 | 3.33E−08 | 1.90E−08 |

Where −2.04E−03 represents that a coefficient A of the surface sequence number S3 is equal to −2.04*10⁻³.

Figure 2:
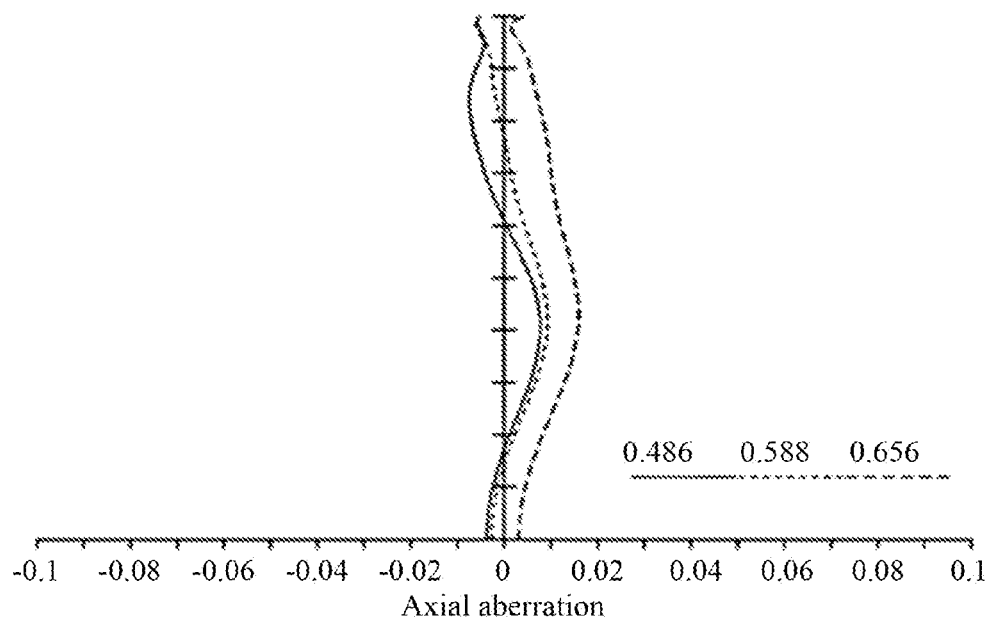
FIG. 2 is a diagram showing an axial aberration of an optical lens according to an embodiment of the present disclosure.

FIG. 2 is a diagram showing an axial aberration of an optical lens according to an embodiment of the present disclosure. A horizontal coordinate represents a distance between the light and a focal point of the optical axis to the image surface in units of mm; a vertical coordinate represents a maximum entrance pupil radius normalization with no units; an offset variation of three wavelengths with an entrance pupil position is distinguished by dotted and solid lines, the three wavelengths of the light are 0.486 μm, 0.587 μm, 0.656 μm respectively, as can be seen from FIG. 2, the optical lens provided by this embodiment has the advantages that aberrations such as a chromatic aberration and a secondary spectrum on a spherical aberration axis from the light with the wavelength of 486 nm to the light with the wavelength of 656 nm may be significantly controlled.

Figure 3:
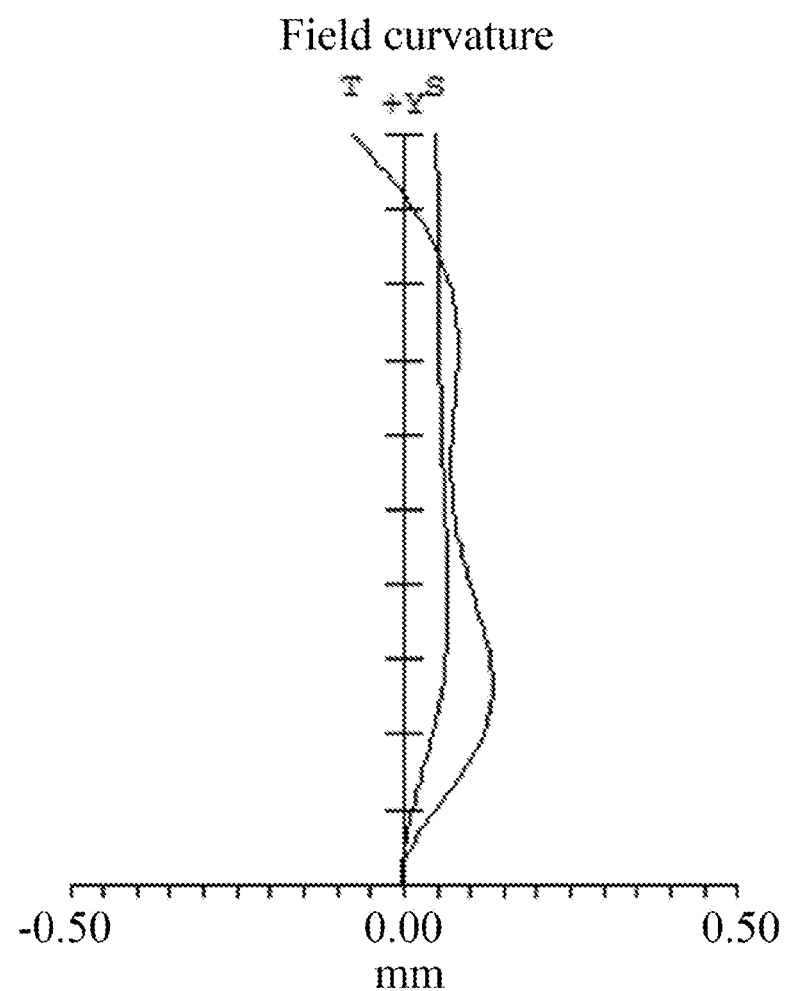
FIG. 3 is a diagram showing a field curvature of an optical lens according to an embodiment of the present disclosure at a wave band of 486 nm.
Figure 4:
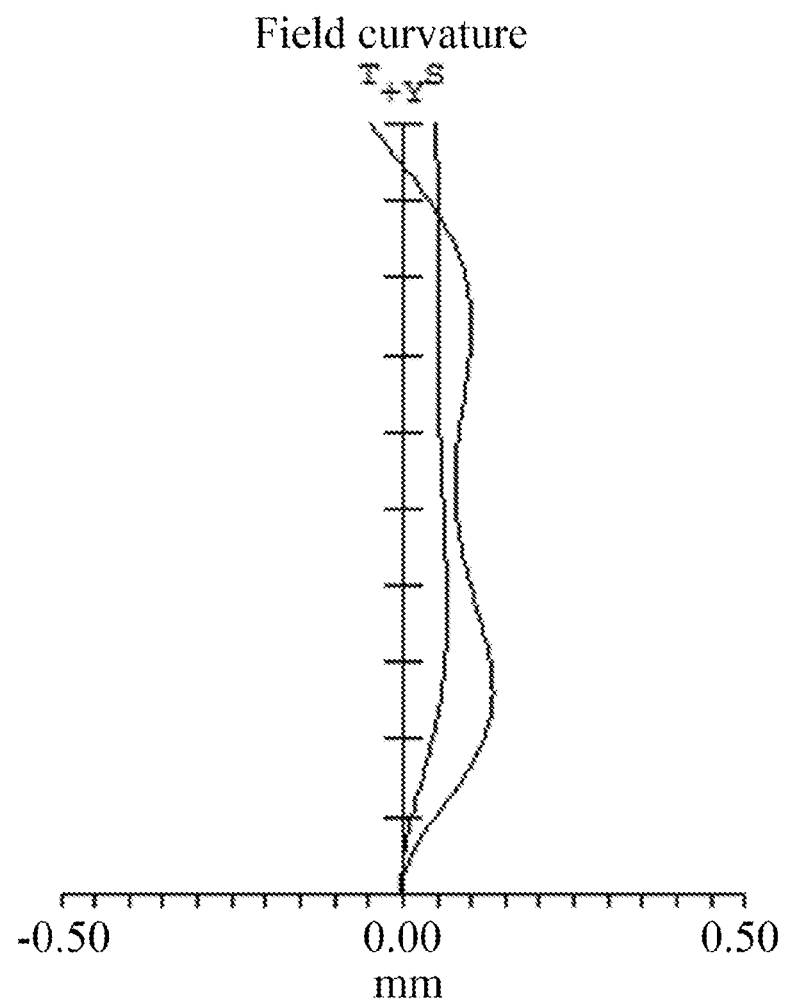
FIG. 4 is a diagram showing a field curvature of an optical lens according to an embodiment of the present disclosure at a wave band of 588 nm.
Figure 5:
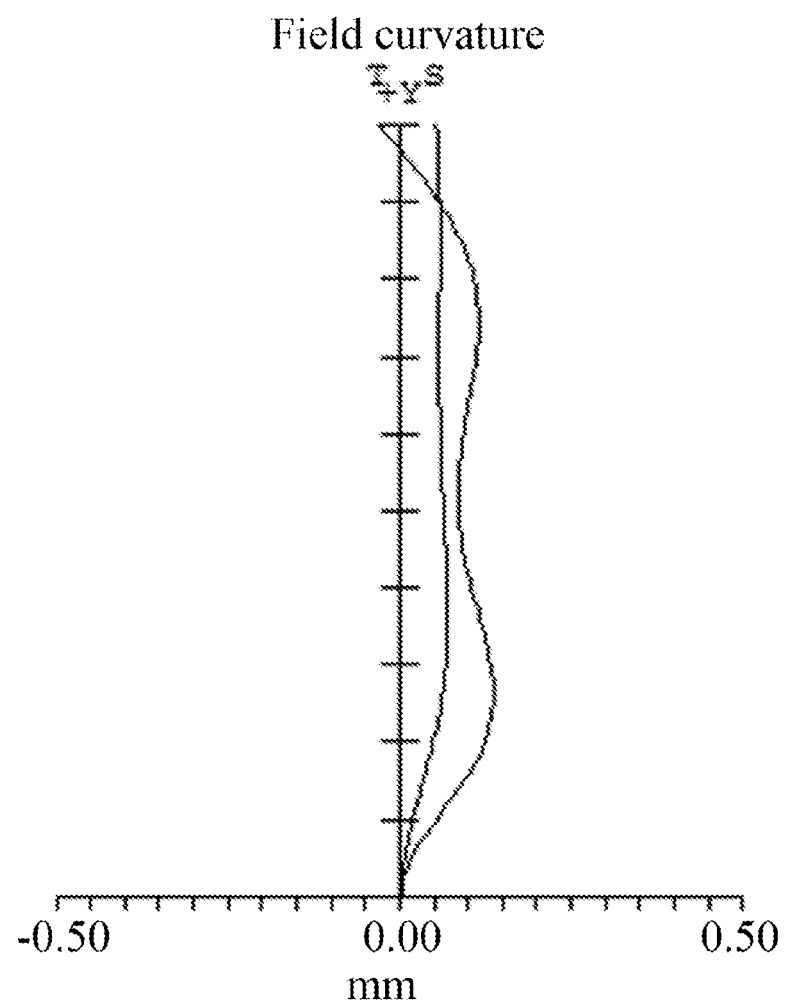
FIG. 5 is a diagram showing a field curvature of an optical lens according to an embodiment of the present disclosure at a wave band of 656 nm.

FIG. 3 is a diagram showing a field curvature of an optical lens according to an embodiment of the present disclosure at a wave band of 486 nm; FIG. 4 is a diagram showing a field curvature of an optical lens according to an embodiment of the present disclosure at a wave band of 588 nm; and FIG. 5 is a diagram showing a field curvature of an optical lens according to an embodiment of the present disclosure at a wave band of 656 nm; where the horizontal coordinate represents the size of the field curvature in units of mm; the vertical coordinate represents a normalized image height with no units; where T represents a meridian and S represents an arc loss; as can be seen from FIGS. 3 to 5, the optical lens provided by this embodiment has the advantages that the field curvature from the light with a wavelength of 486 nm to the light with a wavelength of 656 nm is significantly controlled.

Figure 6:
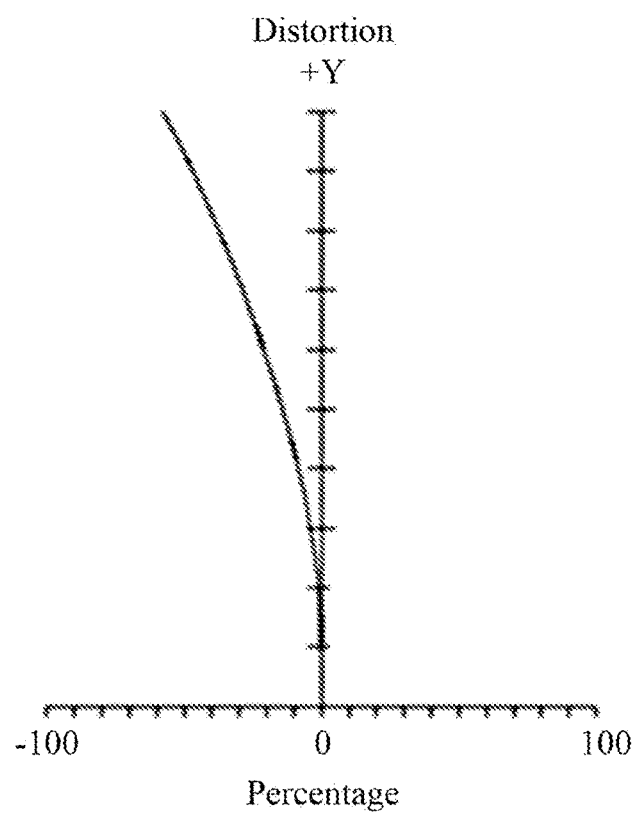
FIG. 6 is a diagram showing an optical distortion of an optical lens according to an embodiment of the present disclosure.

FIG. 6 is a diagram showing an optical distortion of an optical lens according to an embodiment of the present disclosure. The horizontal coordinate represents a size of the distortion in units of %; the vertical coordinate represents a normalized image height with no units; as can be seen from FIG. 6, according to the optical lens provided by the embodiment, the optical distortion is less than 58% for light with a wavelength of 587 nm.

Second Embodiment

Figure 7:
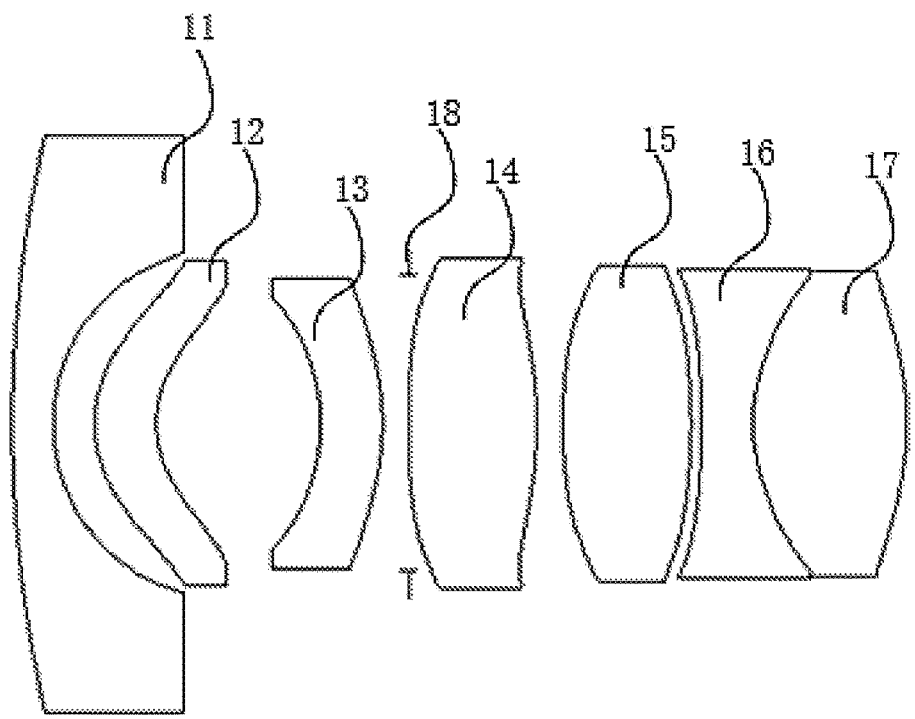
FIG. 7 is a structural view of an optical lens according to one embodiment of the present disclosure.

As shown in FIG. 7, an optical lens includes: a first lens 11, a second lens 12, a third lens 13, a fourth lens 14, a fifth lens 15, a sixth lens 16 and a seventh lens 17, which are sequentially arranged from an object side to an image side along an optical axis.

The first lens 11 is a spherical lens having a negative focal power, the second lens 12 is an aspheric lens having a meniscus shape bent towards an image surface, the third lens 13 is an aspheric lens having a meniscus shape bent towards an object surface, the four lens 14 is an aspheric lens having a positive focal power, the fifth lens 15 is an aspheric lens having a positive focal power, the sixth lens 16 is an aspheric lens having a negative focal power, and the seventh lens 17 is an aspheric lens having a positive focal power, where the sixth lens 16 and the seventh lens 17 form a cemented doublet lens. An object side surface of the first lens 11 is a convex surface, and an image side surface of the first lens 11 is a concave surface; an object side surface of the second lens 12 is a convex surface, and an image side surface of the second lens 12 is a concave surface; an object side surface of the third lens 13 is a concave surface, and an image side surface of the third lens 13 is a convex surface; an object side surface of the fourth lens 14 is a convex surface, and an image side surface of the fourth lens 14 is a convex surface; an object side surface of the fifth lens 15 is a convex surface, and an image side surface of the fifth lens 15 is a convex surface; an object side surface of the sixth lens 16 is a concave surface, and an image side surface of the sixth lens 16 is a concave surface; and an object side surface of the seventh lens 17 is a convex surface, and an image side surface of the seventh lens 17 is a convex surface.

A focal power of the second lens 12 is positive, and a focal power of the third lens 13 is negative.

The fourth lens 14 is configured as a glass aspheric lens, so that a refractive index of the fourth lens 14 is increased, and thus a degree of bending of light is increased, thereby making an optical total length of a large-aperture fixed-focus lens become short. The second lens, the third lens, the fifth lens, the sixth lens and the seventh lens are reasonably matched and configured to be plastic aspheric lenses, and the first lens 11 is a glass spherical lens, so that the cost is significantly controlled while the performance of an optical system is ensured. A shape and a thickness of each lens is uniform, and the processability of the lens is fully ensured.

A diaphragm 18 is further provided between the third lens 13 and the fourth lens 14.

Further, focal lengths of the first lens 11 to the seventh lens 17 satisfy following conditions.

TABLE 4

| f1 = −8.24 | |f1/f| = 2.1 |
| f2 = 121 | |f2/f| = 30.3 |
| f3 = −37.2 | |f3/f| = 9.3 |
| f4 = 8.14 | |f4/f| = 2.0 |
| f5 = 12.8 | |f5/f| = 3.2 |
| f6 = −5.15 | |f6/f| = 1.3 |
| f7 = 5.35 | |f7/f| = 1.3 |

Where f1 represents the focal length of the first lens 11, f2 represents the focal length of the second lens 12, f3 represents the focal length of the third lens 13, f4 represents the focal length of the fourth lens 14, f5 represents the focal length of the fifth lens 15, f6 represents the focal length of the six lens 16, f7 represents the focal length of the seventh lens 17, and f represents a focal length of the optical lens.

TABLE 5

| a design value of the optical lens (f = 4.0 mm, F# = 1.15) | | | | | | |
|---|---|---|---|---|---|---|
| surface sequence number | surface type | radius of curvature | thickness | refractive index | Abbe number | K value |
| S1 | spherical surface | 30.60 | 0.97 | 1.59 | 68.6 | |
| S2 | spherical surface | 4.17 | 0.97 | | | |
| S3 | aspheric surface | 2.84 | 1.45 | 1.54 | 55.7 | −0.76 |

TABLE 5-continued a design value of the optical lens (f = 4.0 mm, F# = 1.15)

| surface sequence number | surface type | radius of curvature | thickness | refractive index | Abbe number | K value |
|---|---|---|---|---|---|---|
| S4 | aspheric surface | 2.44 | 3.88 | | | −1.17 |
| S5 | aspheric surface | −4.39 | 1.45 | 1.64 | 23.9 | −3.94 |
| S6 | aspheric surface | −6.08 | 0.61 | | | −2.15 |
| diaphragm | plane | | 0.00 | | | |
| S8 | aspheric surface | 19.77 | 3.03 | 1.81 | 40.7 | 16.76 |
| S9 | aspheric surface | −9.14 | 0.61 | | | −5.87 |
| S10 | aspheric surface | 12.48 | 3.03 | 1.54 | 55.7 | 4.17 |
| S11 | aspheric surface | −13.91 | 0.24 | | | −13.82 |
| S12 | aspheric surface | −27.51 | 1.21 | 1.66 | 20.3 | −5.00 |
| S13 | aspheric surface | 3.97 | 3.64 | 1.54 | 55.7 | −4.32 |
| S14 | aspheric surface | −6.99 | 4.27 | | | −11.97 |

Surface sequence numbers in the table 5 are numbered according to a surface order of each lens, where "S1" represents a front surface of the first lens 11, "S2" represents a rear surface of the first lens 11, and so on; a radius of curvature represents a bending degree of a lens surface, a positive value represents that this surface is bent towards one side of the image surface, and a negative value represents that this surface is bent toward one side of the object surface, where a "PL" represents that this surface is a plane and the radius of curvature thereof is infinite; a thickness represents a central axial distance from a current surface to a next surface, a refractive index represents a deflection ability of a material between the current surface and the next surface to the light, a blank space represents that a current position is air, and the refractive index is 1; an Abbe number represents a dispersion characteristic of a material between the current surface and the next surface to the light, the blank space represents that the current position is air; K value represents a numerical magnitude of a best fitting cone coefficient for an aspheric surface.

The conic coefficient for the aspheric surface may be limited by the following aspheric relational expression, but not limited to the following representation method.

$$z = \frac{cr^2}{1 + \sqrt{1 - (1+k)c^2 r^2}} + Ar^4 + Br^6 + Cr^8 + Dr^{10} + Er^{12} + Fr^{14}$$

Where z is a axial vector height of the aspheric surface in a Z direction, r is a height of the aspheric surface, c is a curvature of a fitted spherical surface, and a numerical value of the c is equal to a reciprocal of the radius of curvature; k is a fitting cone coefficient, and A-F are an order 4, an order 6, an order 8, an order 10, an order 12 and an order 14 of a polynomial of the aspheric surface.

TABLE 6 a design value of each aspheric parameter in the optical lens

| surface sequence number | A | B | C | D | E | F |
|---|---|---|---|---|---|---|
| S3 | −1.49E−03 | 4.78E−06 | −2.06E−05 | 1.56E−07 | 8.28E−08 | −3.32E−09 |
| S4 | 6.12E−04 | −3.65E−04 | −3.30E−05 | 5.84E−06 | −3.85E−07 | 9.35E−09 |
| S5 | −5.04E−03 | 1.54E−04 | 1.30E−05 | −3.40E−06 | 4.81E−07 | −3.99E−08 |
| S6 | 9.88E−04 | −6.88E−06 | 3.25E−06 | 1.03E−06 | −1.77E−07 | 5.05E−09 |
| S8 | 1.09E−03 | −1.86E−05 | 3.84E−06 | −1.14E−07 | −5.82E−09 | 1.96E−10 |
| S9 | 5.86E−04 | −6.39E−06 | 3.95E−06 | 6.20E−08 | 3.24E−09 | −2.80E−10 |
| S10 | 1.72E−03 | −7.37E−05 | 9.10E−07 | 2.08E−07 | −1.28E−08 | 3.20E−10 |
| S11 | −6.61E−04 | −2.63E−05 | 3.77E−07 | −1.84E−07 | −5.43E−09 | 1.12E−09 |
| S12 | −1.96E−03 | 4.91E−05 | 2.18E−06 | −4.44E−07 | −2.20E−08 | 2.21E−09 |
| S13 | 1.70E−03 | −1.52E−04 | 2.37E−05 | −1.57E−07 | −9.25E−08 | 2.91E−09 |
| S14 | −2.83E−03 | 2.45E−04 | −2.75E−06 | −6.61E−07 | 4.09E−08 | −5.23E−10 |

Where −1.49E−03 represents that a coefficient A of the surface sequence number S3 is equal to −1.49*10$^{−3}$.

Figure 8:
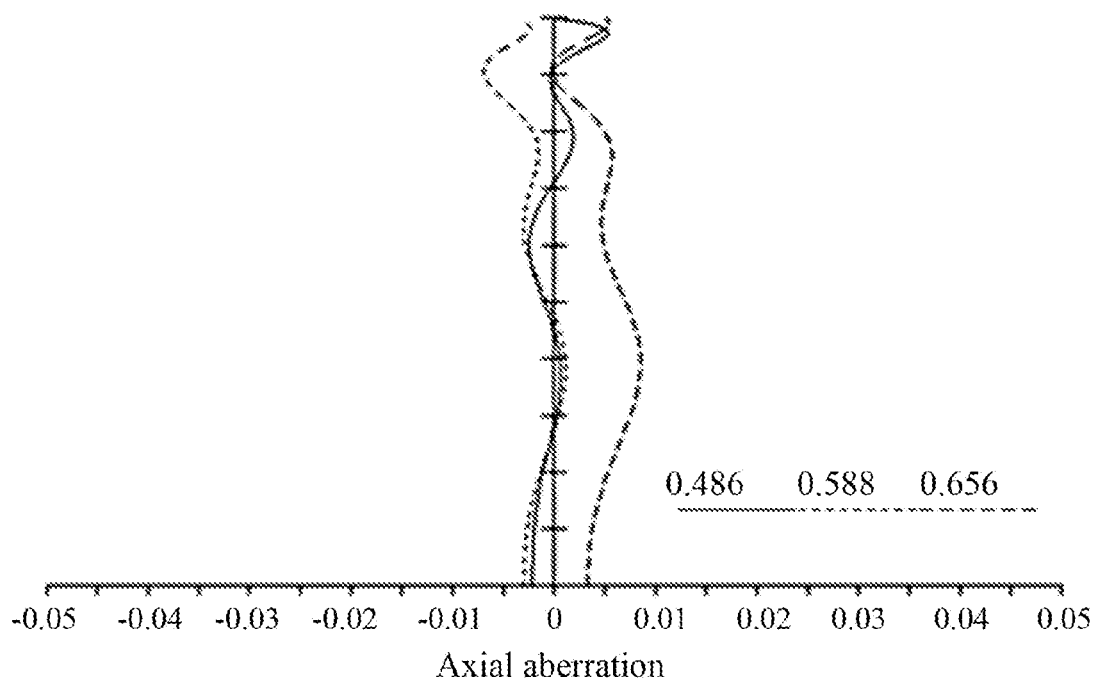
FIG. 8 is a diagram showing an axial aberration of an optical lens according to one embodiment of the present disclosure.

FIG. 8 is a diagram showing an axial aberration of an optical lens according to one embodiment of the present disclosure. A horizontal coordinate represents a distance between the light and a focal point of the optical axis to the image surface in units of mm; a vertical coordinate represents a maximum entrance pupil radius normalization with no units; an offset variation of three wavelengths with an entrance pupil position is distinguished by dotted and solid lines, the three wavelengths of light are 0.486 μm, 0.587 μm, 0.656 μm respectively, as can be seen from FIG. 6, the optical lens provided by this embodiment has the advantages that aberrations such as a chromatic aberration and a secondary spectrum on a spherical aberration axis from the light with the wavelength of 486 nm to the light with the wavelength of 656 nm may be significantly controlled.

Figure 9:
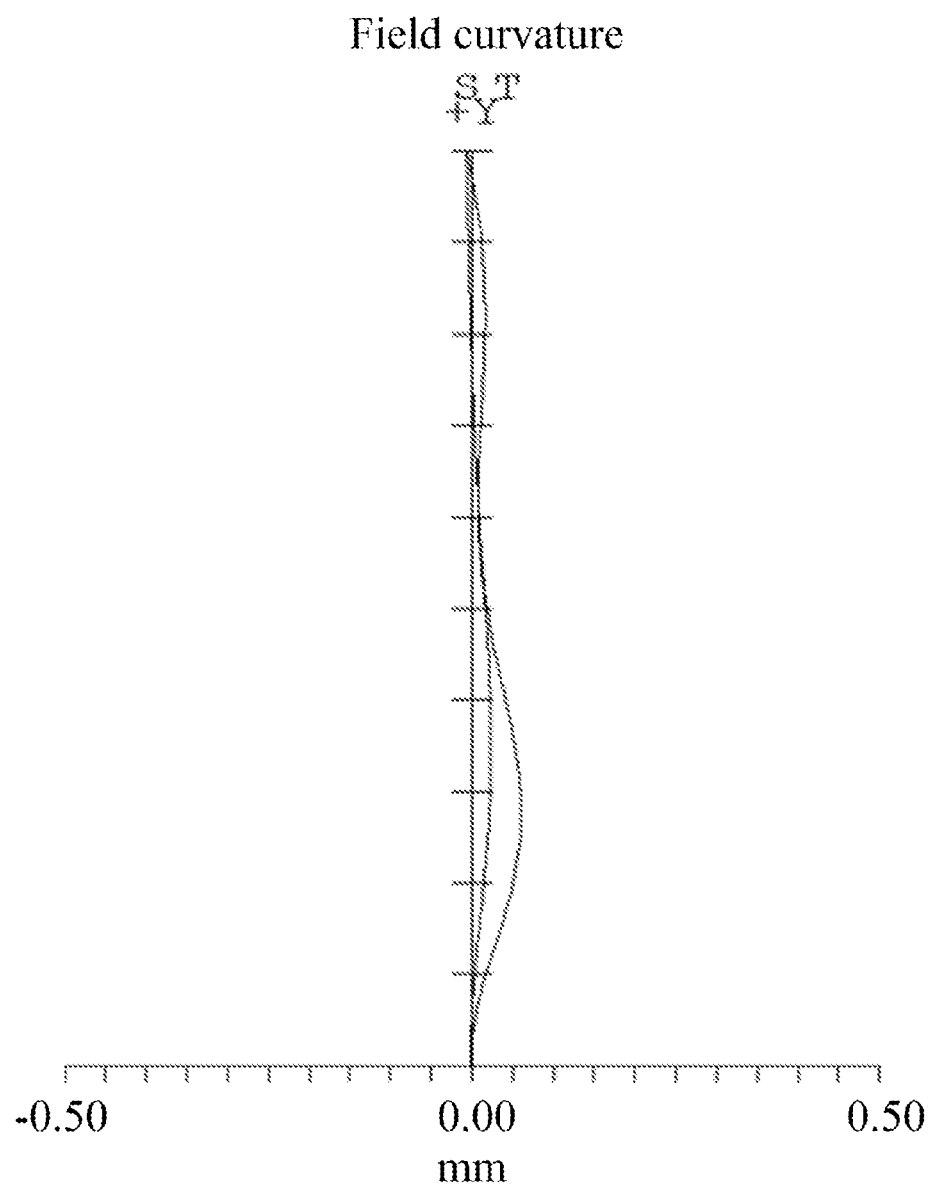
FIG. 9 is a diagram showing a field curvature of an optical lens according to one embodiment of the present disclosure at a wave band of 486 nm.
Figure 10:
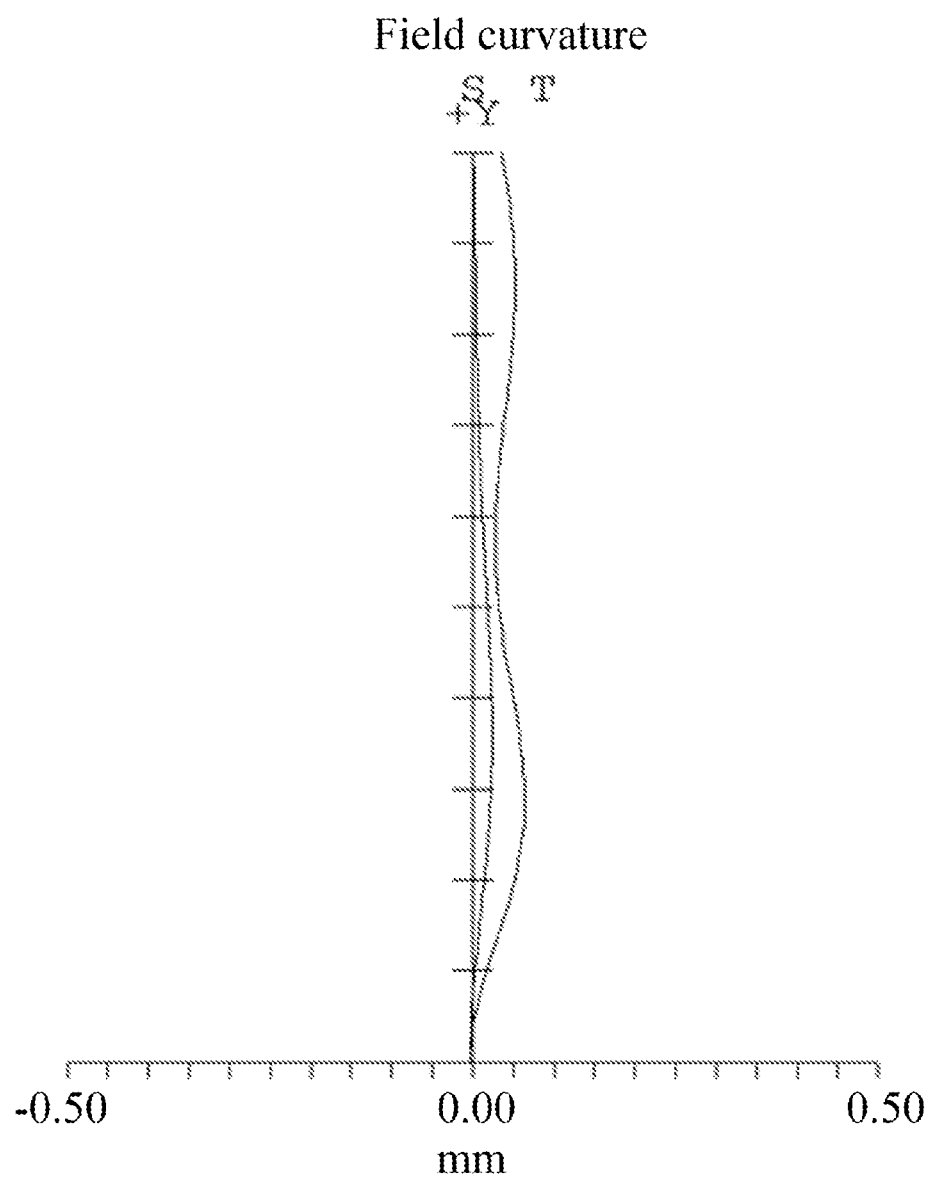
FIG. 10 is a diagram showing a field curvature of an optical lens according to one embodiment of the present disclosure at a wave band of 588 nm.
Figure 11:
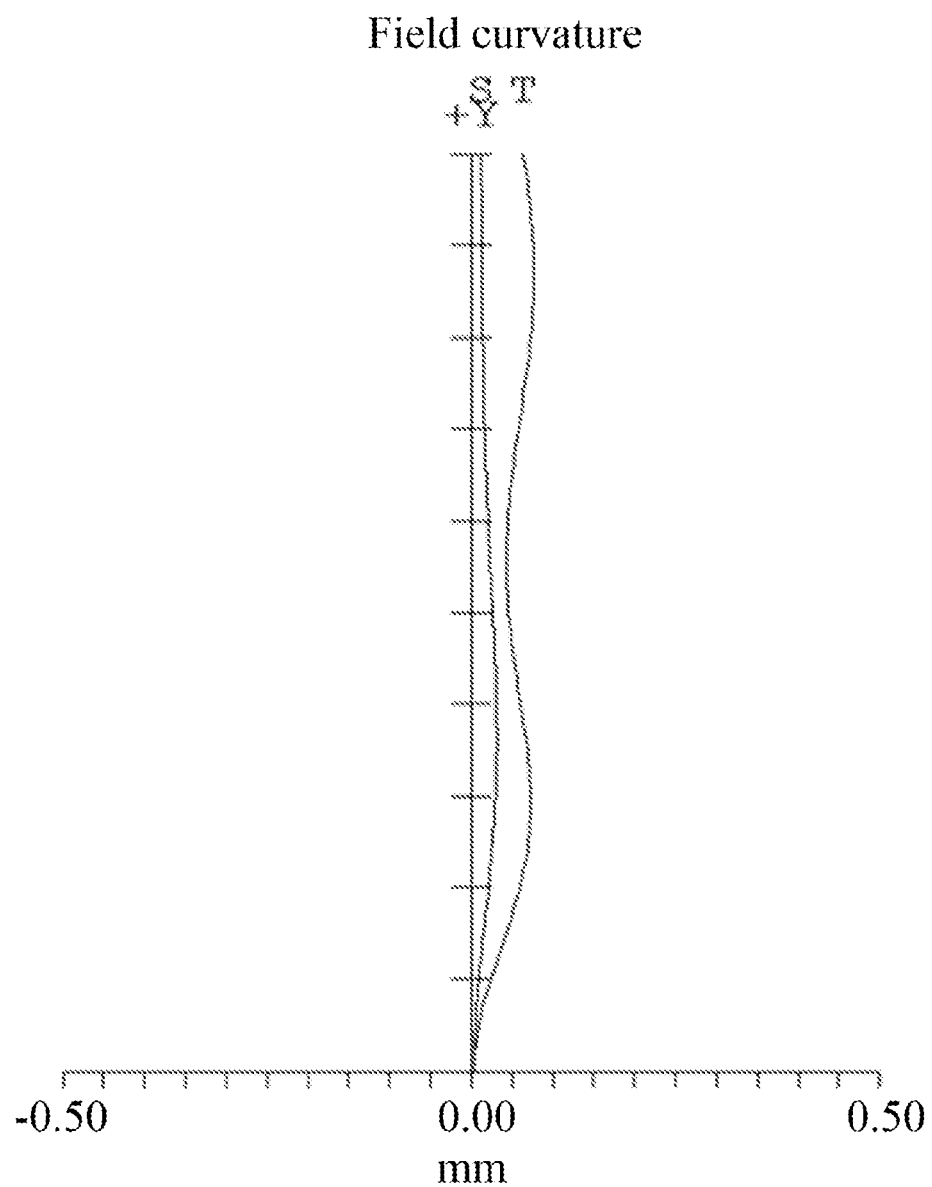
FIG. 11 is a diagram showing a field curvature of an optical lens according to one embodiment of the present disclosure at a wave band of 656 nm.

FIG. 9 is a diagram showing a field curvature of an optical lens according to one embodiment of the present disclosure at a wave band of 486 nm; FIG. 10 is a diagram showing a field curvature of an optical lens according to one embodiment of the present disclosure at a wave band of 588 nm; and FIG. 11 is a diagram showing a field curvature of an optical lens according to one embodiment of the present disclosure at a wave band of 656 nm, where the horizontal coordinate represents the size of the field curvature in units of mm; the vertical coordinate represents a normalized image height with no units; where T represents a meridian and S represents an arc loss; as can be seen from FIGS. 9 to 11, the optical lens provided by this embodiment has the advantages that the field curvature from the light with a wavelength of 486 nm to the light with a wavelength of 656 nm is significantly controlled.

Figure 12:
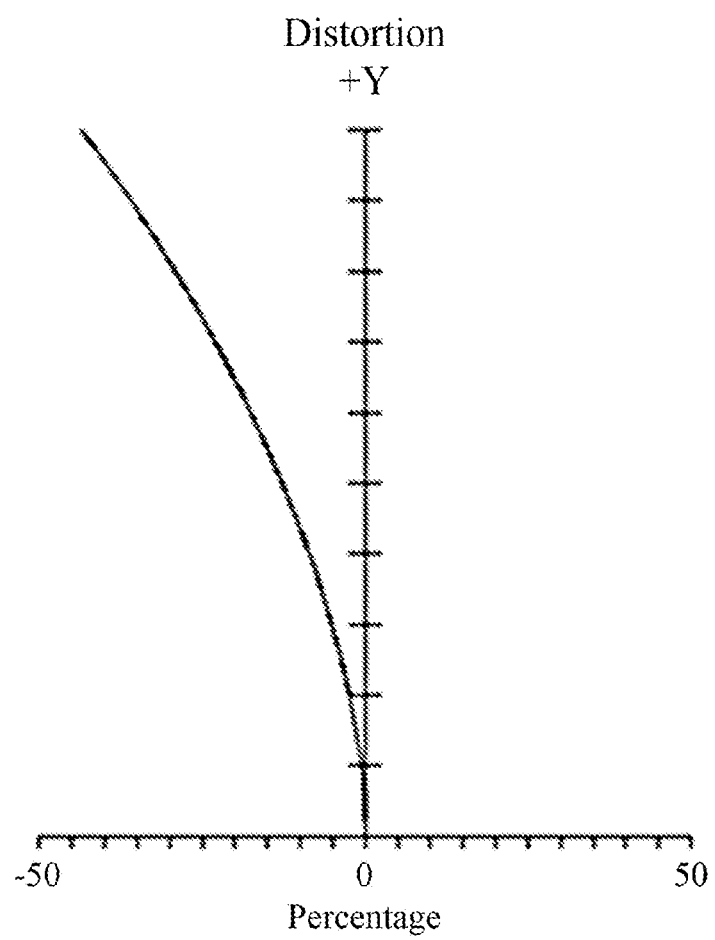
FIG. 12 is a diagram showing an optical distortion of an optical lens according to one embodiment of the present disclosure.

FIG. 12 is a diagram showing an optical distortion of an optical lens according to one embodiment of the present disclosure. The horizontal coordinate represents a size of the distortion in units of %; the vertical coordinate represents a normalized image height with no units; as can be seen from FIG. 12, according to the optical lens provided by the embodiment, the optical distortion is less than 44% for light with a wavelength of 587 nm.

Third Embodiment

Figure 13:
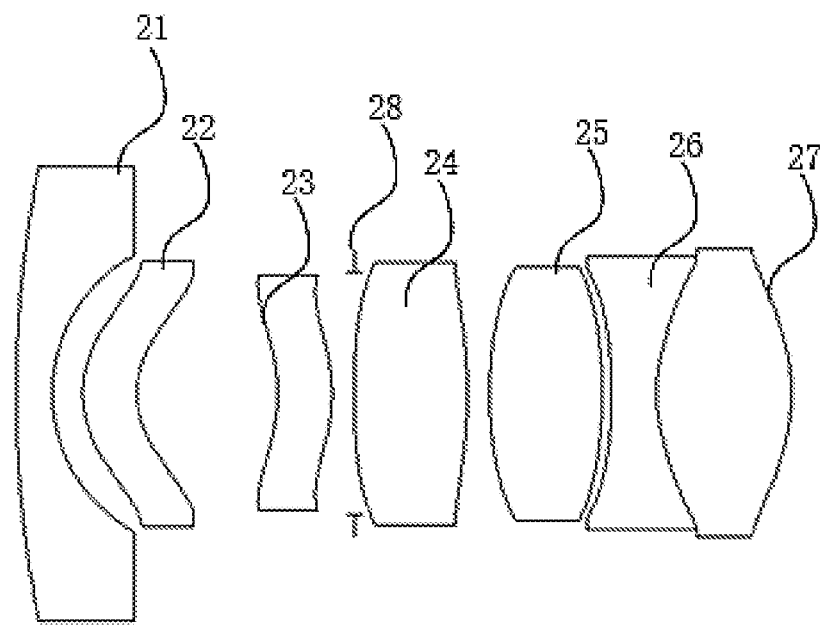
FIG. 13 is a schematic structural view of an optical lens according to another embodiment of the present disclosure.

As shown in FIG. 13, an optical lens includes:

a first lens 21, a second lens 22, a third lens 23, a fourth lens 24, a fifth lens 25, a sixth lens 26 and a seventh lens 27, which are sequentially arranged from an object side to an image side along an optical axis.

The first lens 21 is a spherical lens having a negative focal power, the second lens 22 is an aspheric lens having a meniscus shape bent towards an image surface, the third lens 23 is an aspheric lens having a meniscus shape bent towards an object surface, the four lens 24 is an aspheric lens having a positive focal power, the fifth lens 25 is an aspheric lens having a positive focal power, the sixth lens 26 is an aspheric lens having a negative focal power, and the seventh lens 27 is an aspheric lens having a positive focal power, where the sixth lens 26 and the seventh lens 27 form a cemented doublet lens. An object side surface of the first lens 21 is a convex surface, and an image side surface of the first lens 21 is a concave surface; an object side surface of the second lens 22 is a convex surface, and an image side surface of the second lens 22 is a concave surface; an object side surface of the third lens 23 is a concave surface, and an image side surface of the third lens 23 is a convex surface; an object side surface of the fourth lens 24 is a convex surface, and an image side surface of the fourth lens 24 is a convex surface; an object side surface of the fifth lens 25 is a convex surface, and an image side surface of the fifth lens 25 is a convex surface; an object side surface of the sixth lens 26 is a concave surface, and an image side surface of the sixth lens 26 is a concave surface; and an object side surface of the seventh lens 27 is a convex surface, and an image side surface of the seventh lens 27 is a convex surface.

A focal power of the second lens 22 is positive, and a focal power of the third lens 23 is negative.

The fourth lens 24 is configured as a glass aspheric lens, so that a refractive index of the fourth lens 24 is increased, and thus a degree of bending of light is increased, thereby making an optical total length of a large-aperture fixed-focus lens become short. The second lens, the third lens, the fifth lens, the sixth lens and the seventh lens are reasonably matched and configured to be plastic aspheric lenses, and the first lens 21 is a glass spherical lens, so that the cost is significantly controlled while the performance of an optical system is ensured. A shape and a thickness of each lens is uniform, and the processability of the lens is fully ensured.

A diaphragm 28 is further provided between the third lens 23 and the fourth lens 24.

Further, focal lengths of the first lens 21 to the seventh lens 27 satisfy following conditions.

TABLE 7

| | |
|---|---|
| f1 = −5.91 | |f1/f| = 2.1 |
| f2 = 366 | |f2/f| = 130 |
| f3 = 42.4 | |f3/f| = 15.2 |
| f4 = 8.01 | |f4/f| = 2.9 |
| f5 = 7.45 | |f5/f| = 2.7 |
| f6 = −3.04 | |f6/f| = 1.1 |
| f7 = 3.24 | |f7/f| = 1.2 |

Where f1 represents the focal length of the first lens 21, f2 represents the focal length of the second lens 22, f3 represents the focal length of the third lens 23, f4 represents the focal length of the fourth lens 24, f5 represents the focal length of the fifth lens 25, f6 represents the focal length of the six lens 26, f7 represents the focal length of the seventh lens 27, and f represents a focal length of the optical lens.

TABLE 8

| a design value of the optical lens (f = 2.8 mm, F# = 1.2) | | | | | | |
|---|---|---|---|---|---|---|
| surface sequence number | surface type | radius of curvature | thickness | refractive index | Abbe number | K value |
| S1 | spherical surface | 22.03 | 0.68 | 1.59 | 68.6 | |
| S2 | spherical surface | 2.99 | 0.57 | | | |
| S3 | aspheric surface | 1.95 | 1.02 | 1.54 | 55.7 | −0.88 |
| S4 | aspheric surface | 1.61 | 2.65 | | | −1.04 |
| S5 | aspheric surface | −3.34 | 1.02 | 1.64 | 23.9 | −3.84 |

TABLE 8-continued a design value of the optical lens (f = 2.8 mm, F# = 1.2)

| surface sequence number | surface type | radius of curvature | thickness | refractive index | Abbe number | K value |
|---|---|---|---|---|---|---|
| S6 | aspheric surface | −3.32 | 0.42 | | | −2.20 |
| diaphragm | plane | PL | 0.00 | | | |
| S8 | aspheric surface | 17.73 | 2.12 | 1.81 | 40.7 | 31.37 |
| S9 | aspheric surface | −9.61 | 0.42 | | | 5 |
| S10 | aspheric surface | 8.45 | 2.12 | 1.54 | 55.7 | 3.27 |
| S11 | aspheric surface | −6.88 | 0.17 | | | −40.42 |
| S12 | aspheric surface | −11.09 | 0.85 | 1.66 | 20.3 | −5.00 |
| S13 | aspheric surface | 2.54 | 2.55 | 1.54 | 55.7 | −10.41 |
| S14 | aspheric surface | −3.57 | 3.06 | | | −6.85 |

Surface sequence numbers in the table 8 are numbered according to a surface order of each lens, where "S1" represents a front surface of the first lens 11, "S2" represents a rear surface of the first lens 11, and so on; a radius of curvature represents a bending degree of a lens surface, a positive value represents that this surface is bent towards one side of the image surface, and a negative value represents that this surface is bent toward one side of the object surface, where a "PL" represents that this surface is a plane and the radius of curvature thereof is infinite; a thickness represents a central axial distance from a current surface to a next surface, a refractive index represents a deflection ability of a material between the current surface and the next surface to the light, a blank space represents that a current position is air, and the refractive index is 1; an Abbe number represents a dispersion characteristic of a material between the current surface and the next surface to the light, the blank space represents that the current position is air; K value represents a numerical magnitude of a best fitting cone coefficient for an aspheric surface.

The conic coefficient for the aspheric surface may be limited by the following aspheric relational expression, but not limited to the following representation method.

$$z = \frac{cr^2}{1 + \sqrt{1 - (1+k)c^2 r^2}} + Ar^4 + Br^6 + Cr^8 + Dr^{10} + Er^{12} + Fr^{14}$$

Where z is a axial vector height of the aspheric surface in a Z direction, r is a height of the aspheric surface, c is a curvature of a fitted spherical surface, and a numerical value of the c is equal to a reciprocal of the radius of curvature. k is a fitting cone coefficient, and A-F are an order 4, an order 6, an order 8, an order 10, an order 12 and an order 14 of a polynomial of the aspheric surface.

TABLE 9 a design value of each aspheric parameter in the optical lens

| surface sequence number | A | B | C | D | E | F |
|---|---|---|---|---|---|---|
| S3 | −3.92E−03 | −2.85E−04 | −4.04E−04 | 4.53E−06 | 6.16E−06 | −3.61E−07 |
| S4 | −2.85E−03 | −3.50E−03 | −6.28E−04 | 2.12E−04 | −1.26E−05 | 1.06E−07 |
| S5 | −4.33E−03 | 2.91E−03 | 3.61E−04 | −1.38E−04 | 1.48E−05 | −6.74E−07 |
| S6 | 7.46E−03 | 1.35E−03 | 1.94E−04 | 2.23E−05 | −1.28E−05 | 7.19E−07 |
| S8 | 4.87E−03 | −7.90E−05 | 4.36E−05 | −3.80E−06 | −3.55E−07 | 2.58E−08 |
| S9 | 1.12E−03 | 1.70E−04 | 4.08E−05 | −9.86E−09 | 3.17E−07 | −2.25E−08 |
| S10 | 5.20E−03 | −4.89E−04 | 8.35E−06 | 5.94E−06 | −4.95E−07 | 2.83E−08 |
| S11 | −3.52E−03 | −3.45E−03 | −3.46E−06 | −5.12E−06 | 4.35E−09 | 1.34E−07 |
| S12 | −6.90E−03 | 2.20E−04 | 1.05E−05 | −1.26E−05 | −1.24E−06 | 2.47E−07 |
| S13 | 5.35E−03 | −2.34E−03 | 9.04E−04 | −9.49E−05 | −7.97E−07 | 2.11E−07 |
| S14 | −8.96E−03 | 1.39E−03 | −9.78E−06 | −1.96E−05 | 1.90E−06 | −1.22E−08 |

Where −3.92E−03 represents that a coefficient A of the surface sequence number S3 is equal to −3.92*10⁻³.

Figure 14:
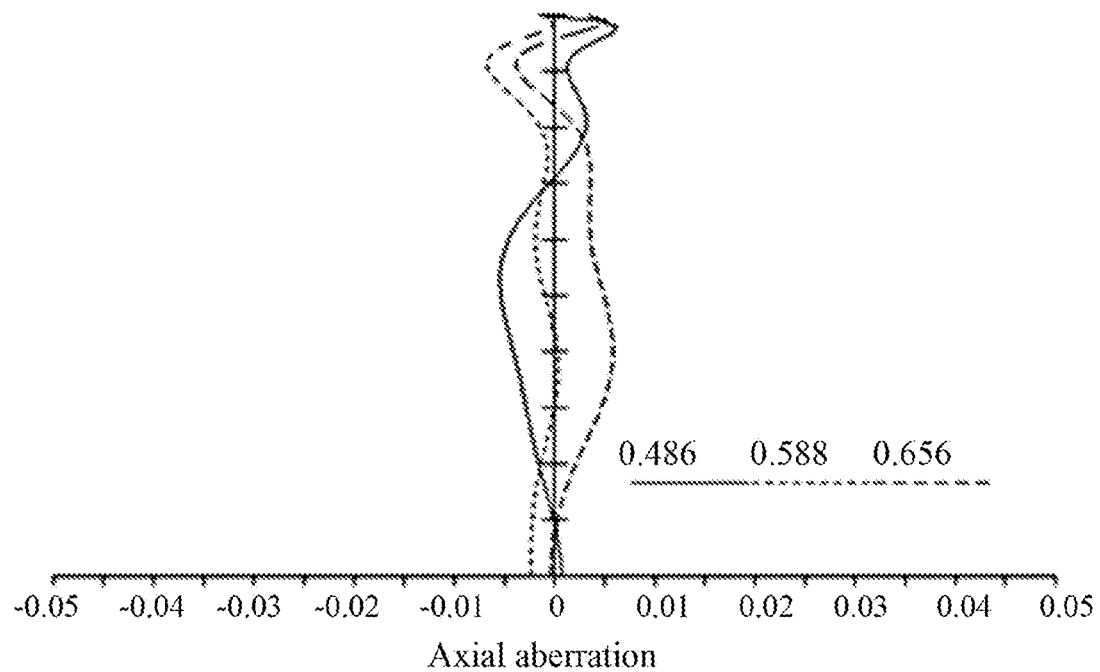
FIG. 14 is a diagram showing an axial aberration of an optical lens according to another embodiment of the present disclosure.

FIG. 14 is a diagram showing an axial aberration of an optical lens according to another embodiment of the present disclosure. A horizontal coordinate represents a distance between the light and a focal point of the optical axis to the image surface in units of mm; a vertical coordinate represents a maximum entrance pupil radius normalization with no units; an offset variation of three wavelengths with an entrance pupil position is distinguished by dotted and solid lines, the three wavelengths of light are 0.486 μm, 0.587 μm, 0.656 μm respectively, as can be seen from FIG. 14, the optical lens provided by this embodiment has the advantages that aberrations such as a chromatic aberration and a secondary spectrum on a spherical aberration axis from the light with the wavelength of 486 nm to the light with the wavelength of 656 nm may be significantly controlled.

Figure 15:
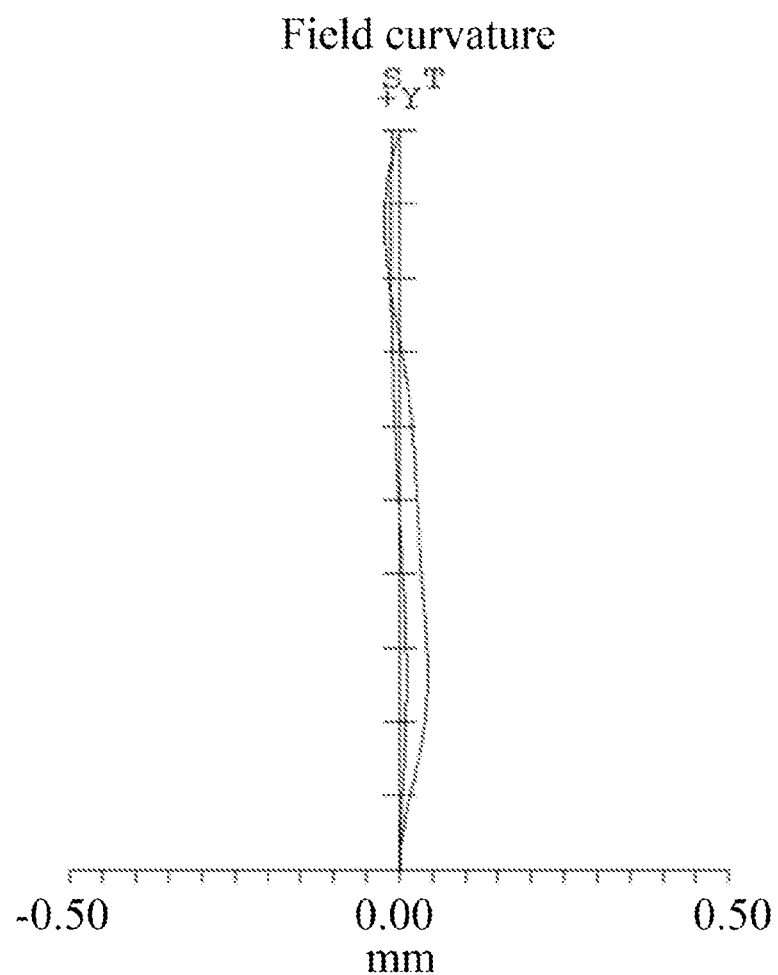
FIG. 15 is a diagram showing a field curvature of an optical lens of another embodiment of the present disclosure at a wave band of 486 nm.
Figure 16:
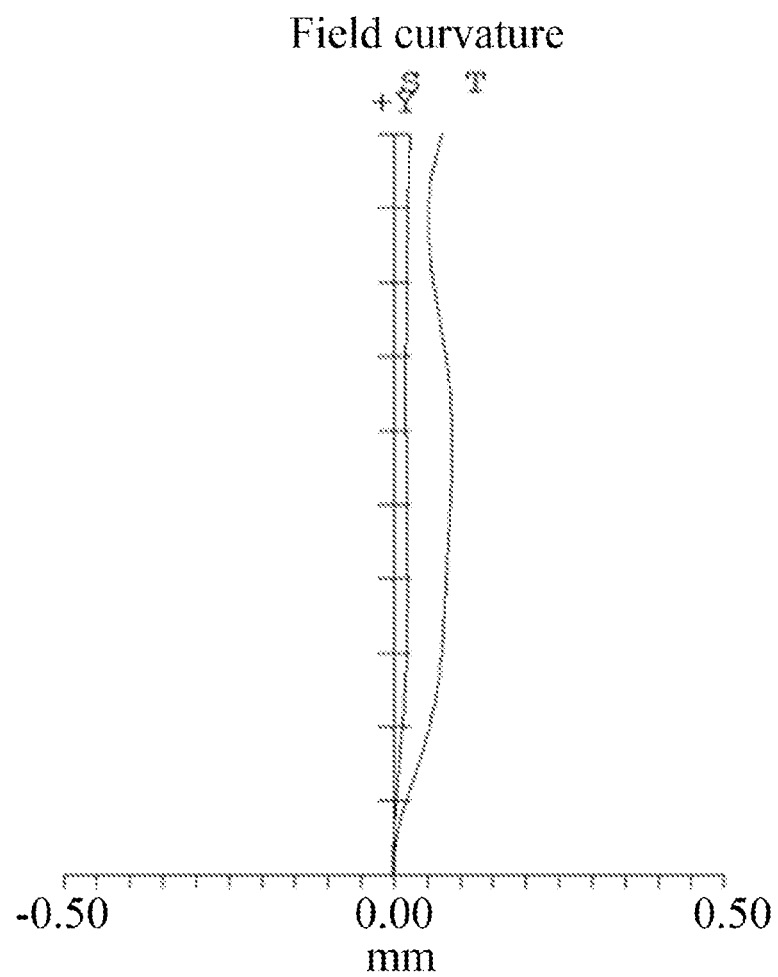
FIG. 16 is a diagram showing a field curvature of an optical lens according to another embodiment of the present disclosure at a wave band of 588 nm.
Figure 17:
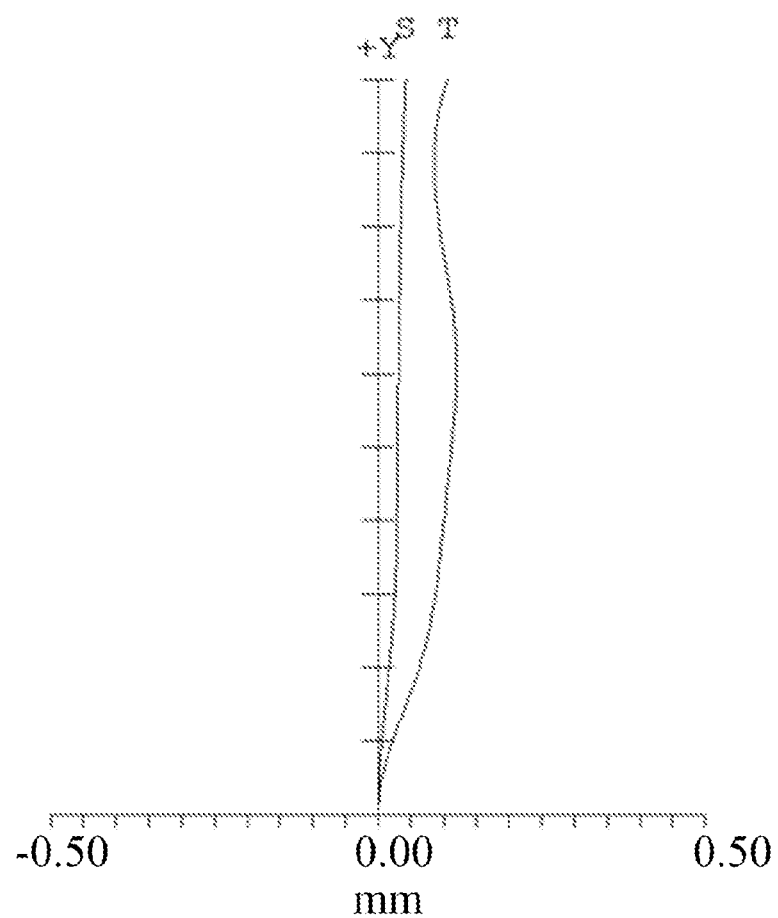
FIG. 17 is a diagram showing a field curvature of an optical lens according to another embodiment of the present disclosure at a wave band of 656 nm.

FIG. 15 is a diagram showing a field curvature of an optical lens of an embodiment of the present disclosure at a wave band of 486 nm; FIG. 16 is a diagram showing a field curvature of an optical lens according to an embodiment of the present disclosure at a wave band of 588 nm; and FIG. 17 is a diagram showing a field curvature of an optical lens according to an embodiment of the present disclosure at a wave band of 656 nm; where the horizontal coordinate represents the size of the field curvature in units of mm; the vertical coordinate represents a normalized image height with no units; where T represents a meridian and S represents an arc loss; as can be seen from FIGS. 15 to 17, the optical lens provided by this embodiment has the advantages that the field curvature from the light with a wavelength of 486 nm to the light with a wavelength of 656 nm is significantly controlled.

Figure 18:
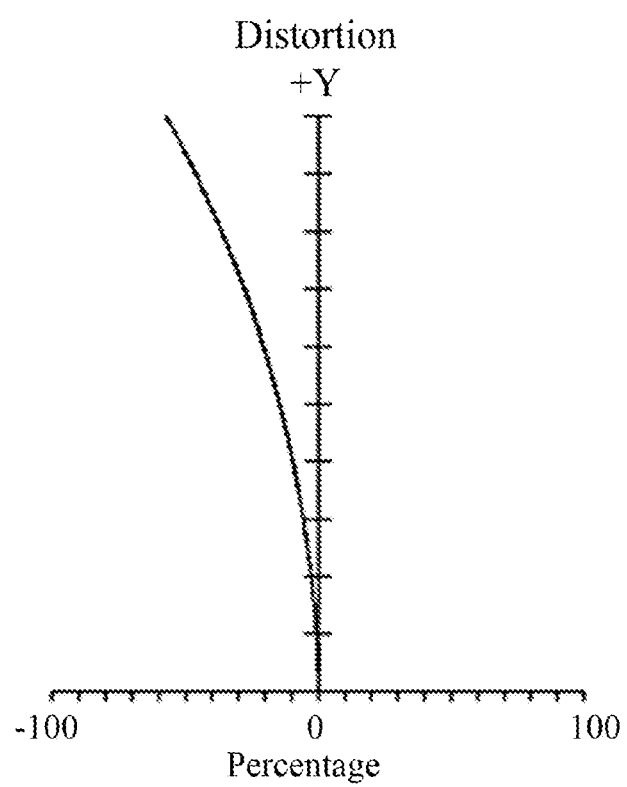
FIG. 18 is a diagram showing an optical distortion of an optical lens according to another embodiment of the present disclosure.

FIG. 18 is a diagram showing an optical distortion according to another embodiment of the present disclosure. The horizontal coordinate represents a size of the distortion in units of %; the vertical coordinate represents a normalized image height with no units; as can be seen from FIG. 18, according to the optical lens provided by the embodiment, the optical distortion is less than 58% for light with a wavelength of 587 nm.

In summary, the optical lens proposed according to the present disclosure is provided with the first lens, the second lens, the third lens, the fourth lens, the fifth lens, the sixth lens and the seventh lens, which are sequentially arranged from the object side to the image side along the optical axis. The first lens is the spherical lens having the negative focal power, the second lens is the aspheric lens having the meniscus shape bent towards the image surface, the third lens is the aspheric lens having the meniscus shape bent towards the object surface, the fourth lens is the aspheric lens having the positive focal power, the fifth lens is the aspheric lens having the positive focal power, the sixth lens is the aspheric lens having the negative focal power, and the seventh lens is the aspheric lens having the positive focal power, where the sixth lens and the seventh lens form the cemented doublet lens, so that the angle of field of view of the optical lens is greater than 110°, and F# satisfies the following relational expression: $0.8<F\#<1.2$.

It should be noted that the above are merely preferred embodiments of the present disclosure and the technical principles applied herein. It should be understood that the present disclosure is not limited to the specific embodiments described herein. For those skilled in the art, various apparent modifications, adaptations and substitutions may be made without departing from the scope of the present disclosure. Therefore, although the present disclosure has been described in detail through the above embodiments, the present disclosure is not limited to the above embodiments and may include more other equivalent embodiments without departing from the concept of the present disclosure. The scope of the present disclosure is determined by the scope of the appended claims.

What is claimed is:

1. An optical lens, comprising:
a first lens, a second lens, a third lens, a fourth lens, a fifth lens, a sixth lens and a seventh lens, which are sequentially arranged from an object side to an image side along an optical axis;

wherein a diaphragm is positioned between the third lens and the fourth lens, wherein an angle of field of view of the optical lens is greater than 110°;

wherein an aperture F of the optical lens satisfies the following relational expression: $0.8<F<1.2$; and wherein the first lens is a spherical lens having a negative focal power, the second lens is an aspheric lens having a meniscus shape bent towards an image surface, the third lens is an aspheric lens having a meniscus shape bent towards an object surface, the fourth lens is an aspheric lens having a positive focal power, the fifth lens is an aspheric lens having a positive focal power, the sixth lens is an aspheric lens having a negative focal power, and the seventh lens is an aspheric lens having a positive focal power, wherein the sixth lens and the seventh lens form a cemented doublet lens.

2. The optical lens of claim 1, wherein the first lens is made of glass, the second lens is made of plastic, the third lens is made of plastic, the fourth lens is made of glass, the fifth lens is made of plastic, the sixth lens is made of plastic, and the seventh lens is made of plastic.

3. The optical lens of claim 1, wherein a surface of one side of the lens closest to the object side is an object side surface, and a surface of one side of the lens closest to the image side is an image side surface, wherein the an object side surface of the first lens is a convex surface, and an image side surface of the first lens is a concave surface;

wherein an object side surface of the second lens is the convex surface, and an image side surface of the second lens is the concave surface;

wherein an object side surface of the third lens is the concave surface, and an image side surface of the third lens is the convex surface;

wherein an object side surface of the fourth lens is the convex surface, and an image side surface of the fourth lens is the convex surface;

wherein an object side surface of the fifth lens is the convex surface, and an image side surface of the fifth lens is the convex surface;

wherein an object side surface of the sixth lens is the concave surface, and an image side surface of the sixth lens is the concave surface; and wherein an object side surface of the seventh lens is the convex surface, and an image side surface of the seventh lens is the convex surface.

4. The optical lens of claim 1, wherein the first lens and the optical lens satisfy the following relational expression: $1.5<|f1/f|<4.0$, wherein f1 is a focal length of the first lens, and f is a focal length of an optical system of the optical lens.

5. The optical lens of claim 1, wherein the second lens and the optical lens satisfy the following relational expression: $|f2/f|>5$, wherein f2 is a focal length of the second lens, and f is a focal length of an optical system of the optical lens.

6. The optical lens of claim 1, wherein the second lens satisfies the following relational expression: $0.9<|ET2/CT2|<2.0$, wherein ET2 is a thickness of an edge of the second lens in an axial direction, and CT2 is a thickness of a center of the second lens in the axial direction.

7. The optical lens of claim 1, wherein the third lens and the optical lens satisfy the following relational expression: $|f3/f|>5$, wherein f3 is a focal length of the third lens, and f is a focal length of an optical system of the optical lens.

8. The optical lens of claim 1, wherein the fourth lens and the optical lens satisfy the following relational expression: $1.5<|f4/f|<4$, wherein f4 is a focal length of the fourth lens, f is a focal length of an optical system of the optical lens, and a refractive index of the fourth lens satisfies the following relational expression: nd4>1.6.

9. The optical lens of claim 1, wherein the fifth lens and the optical lens satisfy the following relational expression: 1.5<|f5/f|<4, wherein f5 is a focal length of the fifth lens, and f is a focal length of an optical system of the optical lens.

10. The optical lens of claim 1, wherein the sixth lens and the optical lens satisfy the following relational expression: 0.8<|F6/f|<3, the seventh lens and the optical lens satisfy the following relational expression: 1<|f7/f|<4, wherein f6 is a focal length of the sixth lens, f7 is a focal length of the seventh lens, and f is a focal length of an optical system of the optical lens;

an Abbe number of the sixth lens and an Abbe number of the seventh lens satisfy the following relational expression: |vd6−vd7|>30, and vd6 is the Abbe number of the sixth lens and vd7 the Abbe number of the seventh lens.

\* \* \* \* \*